(12) United States Patent
Chang

(10) Patent No.: US 10,630,918 B2
(45) Date of Patent: *Apr. 21, 2020

(54) IMAGE SENSING CIRCUIT AND METHOD CAPABLE OF OBTAINING HIGHER IMAGE BRIGHTNESS DYNAMIC RANGE

(71) Applicant: PixArt Imaging Inc., Hsin-Chu (TW)

(72) Inventor: Yen-Min Chang, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/132,449

(22) Filed: Sep. 16, 2018

(65) Prior Publication Data

US 2019/0045147 A1  Feb. 7, 2019

Related U.S. Application Data

(63) Continuation-in-part of application No. 15/810,144, filed on Nov. 13, 2017, now Pat. No. 10,110,836, (Continued)

(30) Foreign Application Priority Data

Jan. 30, 2016 (TW) .............................. 105102988 A

(51) Int. Cl.
*H04N 5/355* (2011.01)
*H04N 5/378* (2011.01)
*H04N 5/353* (2011.01)
*H04N 5/374* (2011.01)
*H04N 5/3745* (2011.01)

(52) U.S. Cl.
CPC ............ *H04N 5/3559* (2013.01); *H04N 5/353* (2013.01); *H04N 5/378* (2013.01); *H04N 5/37452* (2013.01)

(58) Field of Classification Search
CPC ....... H04N 5/3559; H04N 5/353; H04N 5/378; H04N 5/37452
See application file for complete search history.

(56) References Cited

U.S. PATENT DOCUMENTS 7,697,051 B2 *  4/2010  Krymski ........... H01L 27/14609
                                                        250/208.1
8,400,545 B2 *  3/2013  Tejada .................... H04N 5/378
                                                        348/308

(Continued)

*Primary Examiner* — Shahbaz Nazrul
(74) *Attorney, Agent, or Firm* — Winston Hsu

(57) ABSTRACT

An image sensing circuit includes floating node, switch circuit, capacitor(s), and counting circuit. The floating node receives image electric charge from a photosensitive pixel. The switch circuit is coupled between floating node and capacitor(s) to dynamically connect and disconnect floating node and capacitor(s). The capacitor(s) include(s) first terminal(s) connected to switch circuit and second terminal(s) connected to ground. The counting circuit counts the number of charging and discharging behavior of capacitor(s) according to dynamic switches of switch circuit wherein the switch circuit dynamically switches to make capacitor(s) be charged and discharged dynamically in response to one exposure time period to receive energy of image electric charge which is determined by the number of charging and discharging behavior of the capacitor(s) and the capacitor(s)' potential value measured finally.

7 Claims, 5 Drawing Sheets

Related U.S. Application Data which is a continuation of application No. 15/133,203, filed on Apr. 19, 2016, now Pat. No. 9,848,139.

(56) References Cited

U.S. PATENT DOCUMENTS

| | | | |
|---|---|---|---|
| 8,773,562 B1* | 7/2014 | Fan | H01L 27/14643 348/308 |
| 2004/0079977 A1* | 4/2004 | Ying | H04N 3/155 257/292 |
| 2006/0103749 A1* | 5/2006 | He | H04N 5/2355 348/308 |
| 2009/0127434 A1* | 5/2009 | Kim | H04N 5/23245 250/208.1 |
| 2009/0184239 A1* | 7/2009 | Jeong | G01J 1/44 250/214 R |
| 2016/0323524 A1* | 11/2016 | Smith | H04N 5/23245 |
| 2018/0247969 A1* | 8/2018 | Mori | H01L 27/14656 |

\* cited by examiner

IMAGE SENSING CIRCUIT AND METHOD CAPABLE OF OBTAINING HIGHER IMAGE BRIGHTNESS DYNAMIC RANGE

CROSS REFERENCE TO RELATED APPLICATIONS

This application is a continuation in part application and claims the benefit of U.S. Non-provisional application Ser. No. 15/810,144, which was filed on Nov. 13, 2017 and is included herein by reference. In addition, U.S. Non-provisional application Ser. No. 15/810,144 is a continuation application and claims the benefit of U.S. Non-provisional application Ser. No. 15/133,203 filed on Apr. 19, 2016, which is entirely incorporated herein by reference.

BACKGROUND OF THE INVENTION

1. Field of the Invention

The present invention relates to an image sensing mechanism, and more particularly, to an image sensing circuit and method.

2. Description of the Prior Art

Generally speaking, image sensing circuits employed in the existing photosensitive elements usually achieve an effect with a high image brightness dynamic range by performing superposition of multiple images or increasing the sizes of physical capacitors within the photosensitive elements; however, the former needs multiple images to be shot, and the latter increases circuit cost due to the fact that a larger capacitor will occupy a larger circuit area. Hence, both of them have their own drawbacks.

SUMMARY OF THE INVENTION

An objective of the present invention is to provide an image sensing circuit and method capable of obtaining a highest image brightness dynamic range in a single image with a lower circuit cost, to solve the problems of the existing arts.

According to an embodiment of the present invention, an image sensing circuit is disclosed. The image sensing circuit includes a floating node, a switch circuit, and a plurality of capacitors, and a counting circuit. The floating node is arranged to receive image electric charge from a photosensitive pixel. The switch circuit is coupled between the floating node and the capacitors, and is arranged to dynamically connect and disconnect the floating node and the capacitors one at a time in a sequence. Each of the capacitors includes a first terminal coupled to the switch circuit and a second terminal coupled to a ground level. The counting circuit is coupled to the switch circuit, and is arranged to count a number of times of charging and discharging the capacitors according to dynamic switching of the switch circuit, wherein the switch circuit dynamically switches to make the capacitors be dynamically charged and discharged in response to one exposure time period to receive energy of the image electric charge, and the energy of the image electric charge is determined by the number of times of charging and discharging behavior counted by the counting circuit and a finally measured potential value of the one capacitor being connected to the floating node.

According to another embodiment of the present invention, a method arranged for an image sensing circuit is further disclosed. The method includes: providing a floating node arranged to receive image electric charge from a photosensitive pixel; utilizing a switch circuit coupled between the floating node and a plurality of capacitors, wherein the capacitors includes a first terminal coupled to the switch circuit and a second terminal coupled to a ground level; dynamically connecting and disconnecting the floating node and the capacitors one at a time in a sequence to make the capacitors be dynamically charged and discharged in response to one exposure time period to receive energy of the image electric charge; and counting a number of times of charging and discharging the at least one capacitor; wherein the energy of the image electric charge is determined by the counted number of times of charging and discharging of the capacitors and a finally measured potential value of the capacitor being connected to the floating node.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
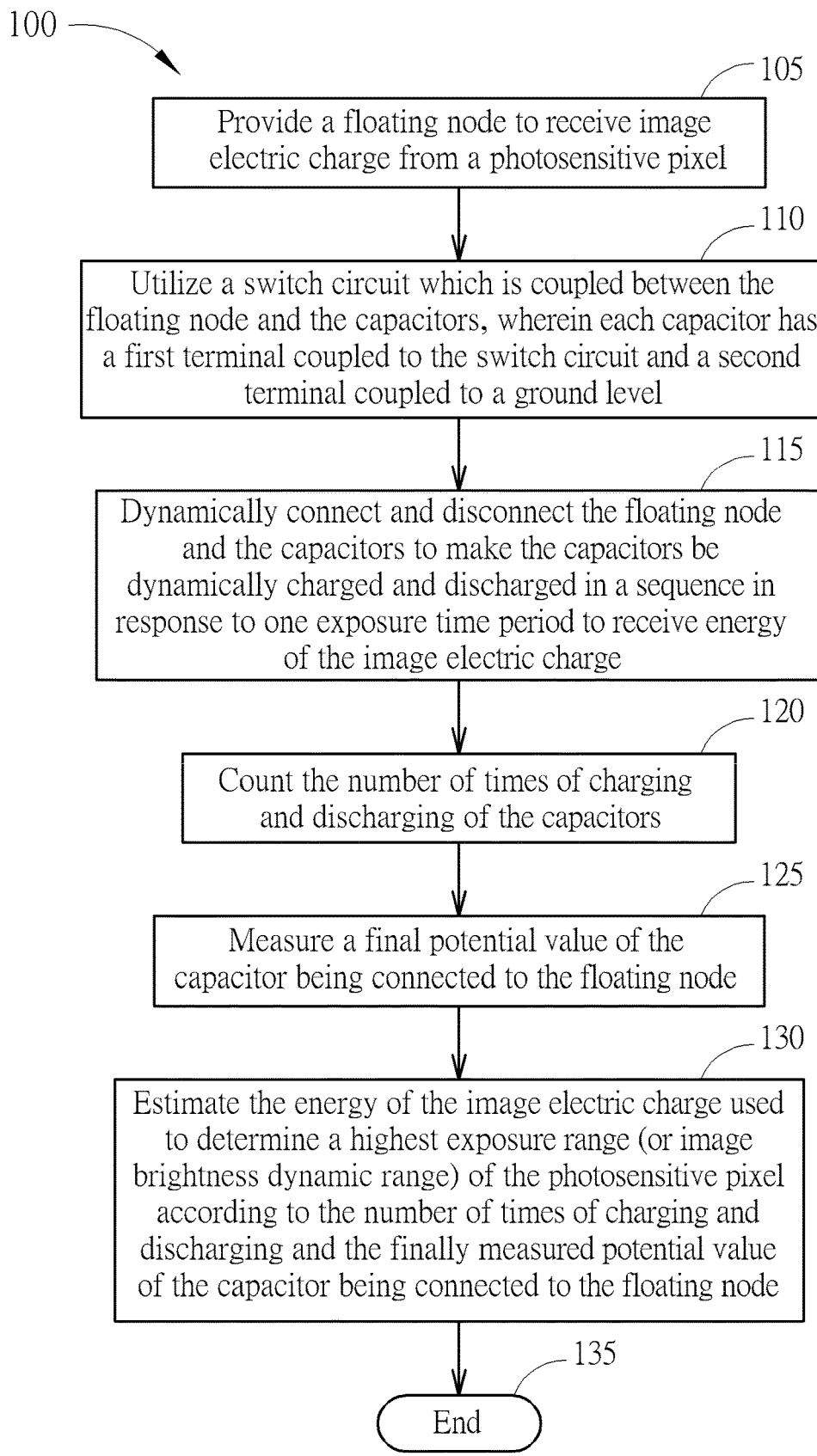
FIG. 1 is a flowchart illustrating an image sensing method/mechanism according to an embodiment of the present invention.

Please refer to FIG. 1, which is a flowchart illustrating an image sensing method/mechanism according to an embodiment of the present invention. The image sensing method/mechanism of the present invention can estimate energy of image electric charge of a photosensitive pixel via the dynamic charging and discharging behavior of capacitors, wherein the photosensitive pixel means a pixel unit of a photosensitive element, and the pixel unit may generate different amounts of energy of image electric charge under conditions of different light source environments (different exposure environments). The image sensing method of the present invention can precisely estimate an amount of energy of image electric charge (which is generated by a photosensitive pixel) via the charging and discharging behavior of a single capacitor or multiple capacitors (i.e., two or more than two capacitors), so as to correctly calculate a dynamic range of image brightness. The image sensing method of the present invention is suitable for different exposure environments, and more particularly, for an exposure environment with strong light to avoid overexposure. By using the image sensing method of the present invention, it is capable of obtaining a highest image brightness dynamic range within a predetermined shutter time allowed for shooting a single image without increasing the circuit cost greatly. Compared with the existing arts, the method of the present invention can obtain the highest image brightness dynamic range even though the capacitance of a capacitor (or multiple capacitors) employed by the present invention is smaller (or much smaller) than the capacitance of a capacitor employed by the existing arts. In addition, the above-mentioned mechanism is also suitable for the roller blind/rolling shutter and the global shutter. Provided that substantially the same result is achieved, the steps of the flowchart shown in FIG. 1 need not be in the exact order shown and need not be contiguous; that is, other steps can be intermediate. The flow of the image sensing method of the present invention is detailed as follows.

Step 105: Provide a floating node to receive image electric charge from a photosensitive pixel;

Step 110: Utilize a switch circuit which is coupled between the floating node and the capacitors, wherein each capacitor has a first terminal coupled to the switch circuit and a second terminal coupled to a ground level;

Step 115: Dynamically connect and disconnect the floating node and the capacitors to make the capacitors be dynamically charged and discharged in a sequence in response to one exposure time period to receive energy of the image electric charge;

Step 120: Count the number of times of charging and discharging of the capacitors;

Step 125: Measure a final potential value of the capacitor being connected to the floating node;

Step 130: Estimate the energy of the image electric charge used to determine a highest exposure range (or image brightness dynamic range) of the photosensitive pixel according to the number of times of charging and discharging and the finally measured potential value of the capacitor being connected to the floating node; and Step 135: End.

Figure 2:
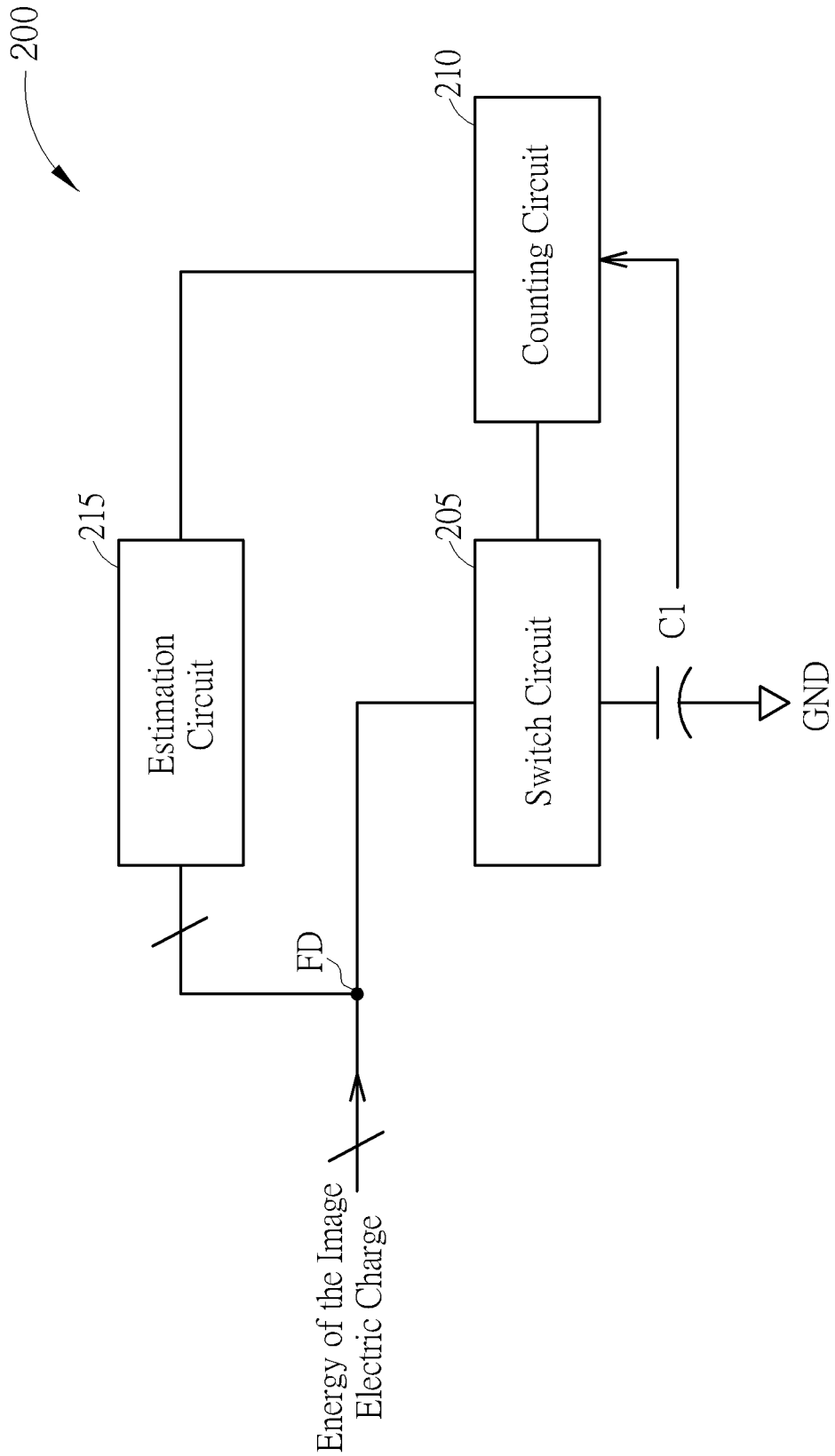
FIG. 2 is a diagram illustrating an image sensing circuit according to the first embodiment of the present invention.

A first embodiment of the present invention is to estimate energy of image electric charge by utilizing the charging and discharging behavior of a single capacitor. Please refer to FIG. 2, which is a diagram illustrating an image sensing circuit 200 according to the first embodiment of the present invention. The image sensing circuit 200 is capable of estimating energy of image electric charge of a photosensitive pixel (which is located outside the image sensing circuit 200 and not shown in FIG. 2). The photosensitive pixel means a pixel unit of a photosensitive element. The pixel unit may generate different amounts of energy of image electric in different light source environments (different exposure environments). The image sensing circuit 200 of the present invention is capable of precisely estimating an amount of energy of image electric charge generated by the photosensitive pixel and correctly calculating an image brightness dynamic range. The image sensing circuit 200 of the present invention is suitable for different exposure environments. In the first embodiment, a potential difference increment (or voltage increment) which is correspondingly generated by energy of image charge on a single capacitor is estimated/determined through the charging and discharging behavior of the single capacitor, thereby judging an amount of the energy of image electric charge equivalently. The image sensing circuit 200 includes a floating node FD, a switch circuit 205, a capacitor C1, a counting circuit 210, and an estimation circuit 215. The floating node FD is connected to an external photosensitive pixel to receive energy of image electric charge generated by the external photosensitive pixel. When the floating node FD receives energy of image electric charge, a connection between the floating node FD and the estimation circuit 215 is cut off. When the floating node FD finishes receiving energy of image electric charge, a connection between the floating node FD and the estimation circuit 215 is established, such that the estimation circuit 215 can measure a final potential value of the capacitor C1 via the floating node FD and the switch circuit 205. The switch circuit 205 is coupled between the floating node FD and the capacitor C1, and is arranged to dynamically connect and disconnect the floating node FD and the capacitor C1. The capacitor C1 includes a first terminal coupled to the switch circuit 205, and a second terminal coupled to the ground level GND. The counting circuit 210 is coupled to the switch circuit 205 and the estimation circuit 215, and is arranged to count a number of times of charging and discharging the capacitor C1 according to dynamic switching of the switch circuit 205, wherein the switch circuit 205 performs dynamic switching to make the capacitor C1 be dynamically charged and discharged in response to one exposure time period to receive energy of image electric charge, and the energy of image electric charge is determined by the number of times of charging and discharging (which is counted by the counting circuit 210) and a finally measured potential value of the capacitor C1. The estimation circuit 215 is coupled to the capacitor C1 and the counting circuit 210, and is arranged to measure a final potential of the capacitor C1. The estimation circuit 215 estimates the energy of image electric charge according to the number of times of charging and discharging the capacitor C1 and the finally measured potential value of the capacitor C1, so as to determine a highest exposure range (or image brightness dynamic range) of the photosensitive pixel.

When the capacitor C1 is ready to be charged (e.g., the potential of the capacitor C1 is zero) at this moment, the counting circuit 210 controls the switch circuit 205 to connect the floating node FD and the capacitor C1, such that the capacitor C1 starts to receive input energy of image electric charge. If the capacitor C1 cannot be fully charged with the energy of image electric charge during a single charging operation, then, under the condition that the potential of the capacitor C1 does not exceed a predetermined potential (e.g., a rated highest potential/voltage), the potential of the capacitor C1 will be finally raised up to a final potential value VC1 due to the charging behavior. Under this circumstance, the capacitor C1 does not experience a complete charging and discharging behavior once during the process that starts from initially receiving energy of the image electric charge and ends at completely receiving the energy of image electric charge. Since the counting circuit 210 is arranged to count a number of times of charging and discharging the capacitor C1, the number of times of charging and discharging the capacitor C1 is zero accordingly. Therefore, according to the final potential value VC1 of the capacitor C1 and the number of times of charging and discharging (which is equal to zero at this moment), the estimation circuit 215 can determine that the potential of the capacitor C1 with a capacitance value is increased by a potential value increment VC1 when the capacitor C1 with the capacitance value is used to receive energy of image electric charge. According to the capacitance value of the capacitor C1 and the judged potential value increment VC1, the amount of energy of image electric charge can be equivalently estimated. According to the judged potential value increment VC1, it is capable of calculating the highest exposure strength (i.e., dynamic range of image) under the current light source environment.

In addition, the counting circuit 210 detects the capacitor C1 to determine whether the current potential of capacitor C1 has been charged to the predetermined potential and to determine whether the current potential of capacitor C1 has been discharged to a zero potential. For example, the counting circuit 210 can measure the current potential of the capacitor C1 to determine whether the current potential of the capacitor C1 has been charged to the rated highest potential/voltage (i.e., determine whether the capacitor C1 has been fully charged) and determine whether the current potential of the capacitor C1 is at a zero potential due to discharging (i.e., determine whether electric charge is fully discharged). Assume that the rated highest potential/voltage is designed to act as the predetermined potential. Considering a case where the energy of image electric charge is greater than the energy that can be stored by the capacitor C1 during a single charging operation, when the capacitor C1 has been fully charged with a portion of the energy of image electric charge, the counting circuit 210 controls the switch circuit 205 to perform switching, such that the switch circuit 205 cuts off a connection between the floating node FD and the capacitor C1, thus making the capacitor C1 be discharged. After all electric charge on the capacitor C1 has been discharged (i.e., after the capacitor C1 is fully discharged), the counting circuit 210 controls the switch circuit 210 to perform switching again to connect the floating node FD and the capacitor C1 to continue receiving another portion of the energy of image electric charge. At this moment, the counting circuit 210 sets the number of charging and discharging the capacitor C1 by one. That is, the behavior of charging a capacitor from a zero potential to the predetermined potential (e.g., the rated highest potential/voltage) and subsequently discharging the same capacitor from the predetermined potential to the zero potential is regarded as one complete charging and discharging behavior. Through repeatedly controlling the dynamic switching of the switch circuit 205 as mentioned above and detecting/controlling the charging and discharging behavior of the capacitor C1 that starts from initially receiving the energy of image electric charge and ends at completely receiving the energy of image electric charge, the counting circuit 210 can accumulate the number N of times of charging and discharging the capacitor C1, where N is a positive integer. The estimation circuit 215 can measure the final potential value VC1 of the capacitor C1, and can obtain the number N of times of charging and discharging from the counting circuit 210. Therefore, according to the number N of times of charging and discharging of the capacitor C1 and the final potential value VC1 of the capacitor C1, the estimation circuit 215 can determine that the potential of the capacitor C1 with a capacitance value is increased by a potential value increment VC1+VMAX*N when the capacitor C1 with the capacitance value is used to receive energy of image electric charge, wherein VMAX is the rated highest potential of the capacitor C1 (i.e., the highest potential value of the capacitor C1 when the capacitor C1 is fully charged). According to the capacitance value of the capacitor C1 and the judged potential value increment VC1+VMAX*N, the amount of the energy of image electric charge can be estimated equivalently. In addition, according to the judged potential value increment VC1+VMAX*N, the highest exposure strength (image brightness dynamic range) of the current light source environment can be estimated.

Furthermore, in an alternative design of the first embodiment, the estimation circuit 215 is implemented outside the image sensing circuit 200 and thus excluded from the image sensing circuit 200. In other words, the image sensing circuit 200 is arranged to control and count a number of times of charging and discharging the capacitor C1, and the subsequent estimation operation is performed by an external estimation circuit. In addition, the switch circuit 205 and the counting circuit 210 may be integrated into a same circuit.

Figure 3:
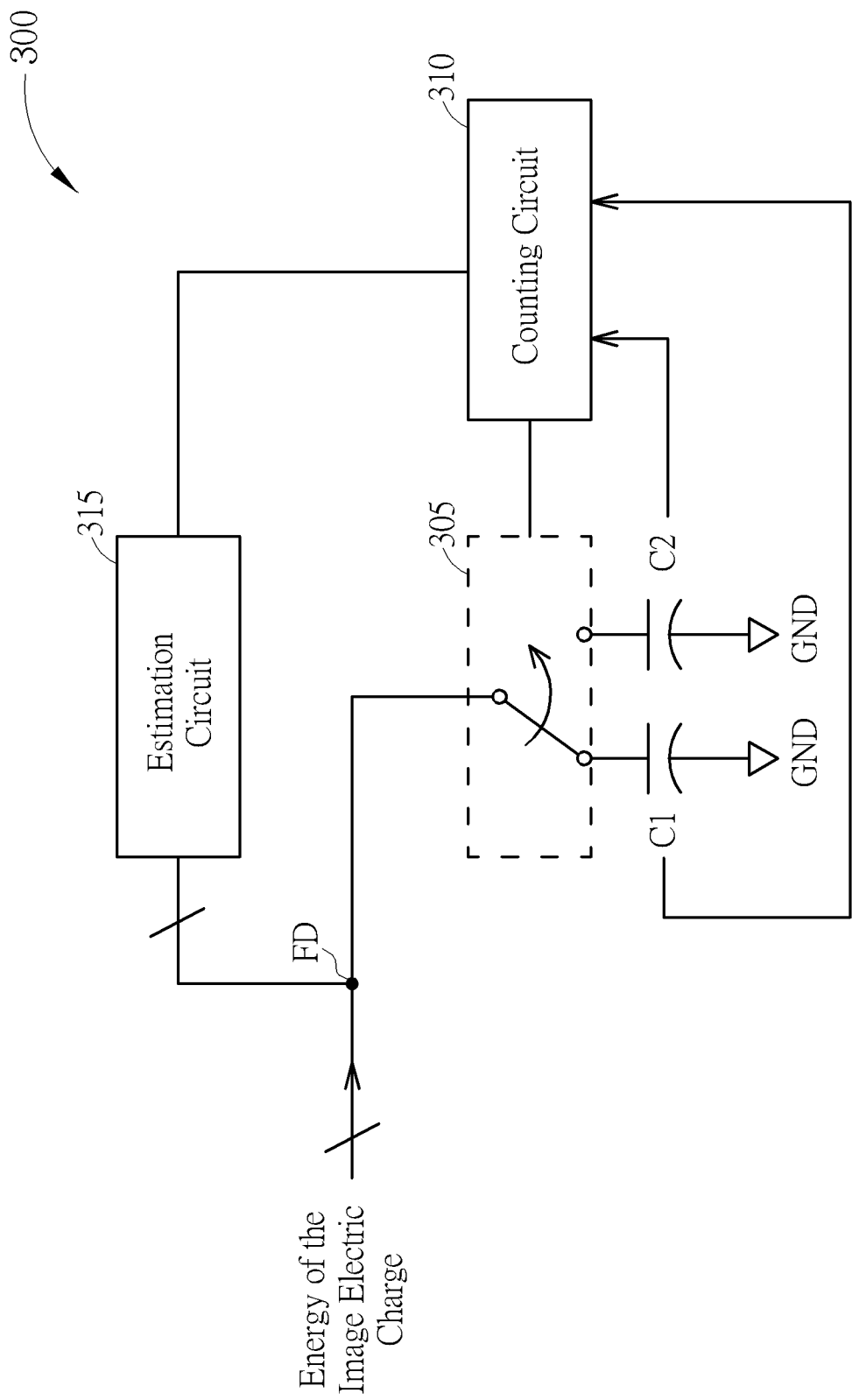
FIG. 3 is a diagram illustrating an image sensing circuit according to the second embodiment of the present invention.

A second embodiment of the present invention is to utilize two capacitors which are sequentially charged and discharged to replace/simulate a single capacitor, and estimate/determine a potential difference increment (or voltage increment) correspondingly generated by the energy of image electric charge through monitoring the charging and discharging behavior of the two capacitors, so as to equivalently judge the amount of the energy of image electric charge. An advantage of such a design is that a two-capacitor configuration may be implemented by using capacitors with smaller capacitance to decrease the circuit cost. Please refer to FIG. 3, which is a diagram illustrating an image sensing circuit 300 according to the second embodiment of the present invention. The image sensing circuit 300 is capable of estimating energy of image electric charge of a photosensitive pixel (which is located outside the image sensing circuit 300 and not shown in FIG. 3). The photosensitive pixel means a pixel unit of a photosensitive element. The pixel unit may generate different amounts of energy of image electric charge in different light source environments (different exposure environments). The image sensing circuit 300 of the present invention is capable of precisely estimating an amount of energy of image electric charge generated by a photosensitive pixel and correctly calculating an image brightness dynamic range. The image sensing circuit 300 of the present invention is suitable for different exposure environments. In the second embodiment, the potential difference increment (or voltage increment) which is correspondingly generated by energy of image charge on capacitors is estimated/determined through the charging and discharging behavior of the two capacitors C1 and C2, thereby determining an amount of the energy of image electric charge equivalently. The image sensing circuit 300 includes a floating node FD, a switch circuit 305, capacitors C1 and C2, a counting circuit 310, and an estimation circuit 315. The floating node FD is connected to an external photosensitive pixel to receive energy of image electric charge generated by the external photosensitive pixel. When the floating node FD receives energy of image electric charge, a connection between the floating node FD and the estimation circuit 315 is cut off. When the floating node FD finishes receiving the energy of image electric charge, a connection between the floating node FD and the estimation circuit 315 is established, such that the estimation circuit 315 can measure the final potential value of the capacitor C1 or C2 via the floating node FD and the switch circuit 305. The switch circuit 305 is coupled between the floating node FD and the capacitors C1 and C2, and is arranged to dynamically connect and disconnect the floating node FD and the capacitors C1 and C2. Both of the capacitors C1 and C2 include a first terminal coupled to the switch circuit 305 and a second terminal coupled to the ground level GND. The switch circuit 305 is connected to one of the capacitors C1 and C2, and switches the connection of the other of the capacitors C1 and C2. The counting circuit 310 is coupled to the switch circuit 305 and the estimation circuit 315, and is arranged to count a number of times of charging and discharging the capacitors C1 and C2 according to dynamic switching of the switch circuit 305, wherein the switch circuit 305 dynamically switches to make the capacitors C1 and C2 be dynamically charged and discharged in response to one exposure time period to receive energy of image electric charge, and the energy of image electric charge is determined by the number of times of charging and discharging (which is counted by the counting circuit 310) and a finally measured potential value of the capacitor C1 or C2. The estimation circuit 315 is coupled to the capacitors C1 and C2 and the counting circuit 310, and is arranged to measure a final potential of the capacitor C1 or C2. The estimation circuit 315 estimates the energy of image electric charge according to the number of times of charging and discharging the capacitors C1 and C2 and the finally measured potential value of the capacitor C1 or C2, so as to determine a highest exposure range (or image brightness dynamic range) of the photosensitive pixel.

When the capacitors C1 and C2 are ready to be charged (e.g., the potentials of the capacitors C1 and C2 are zero at this moment), the image sensing circuit 300 receives energy of image electric charge by using the capacitor C1 first. When the capacitor C1 is fully charged (the rated highest potential/voltage is designed as the predetermined potential), the capacitor C2 is used to continuously receive the energy of image electric charge (at this moment, the capacitor C1 is being discharged). Alternatively, the image sensing circuit 300 may receive energy of image electric charge by using the capacitor C2 first. When the capacitor C2 is fully charged, the capacitor C1 is used to continuously receive the energy of image electric charge (at this moment, the capacitor C2 is being discharged). This is not meant to be a limitation to the present invention. As for the case of charging the capacitor C1 first, in practice, the counting circuit 310 controls the switch circuit 305, and connects the floating node FD and the capacitor C1, such that the capacitor C1 starts to receive input energy of image electric charge, and a connection between the capacitor C2 and the floating node FD is cut off. If the capacitor C1 cannot be fully charged with the energy of image electric charge during a single charging operation, then, under the condition that a potential of the capacitor C1 does not exceed the rated highest potential of the capacitor C1, the potential of the capacitor C1 will be finally raised up to a final potential value VC1 due to the charging behavior. Under this circumstance, in the process that starts from initially receiving energy of the image electric charge and ends at completely receiving the energy of image electric charge, the capacitor C1, C2 does not experience a complete charging and discharging behavior once. Since the counting circuit 310 is arranged to count a number of times of charging and discharging the capacitor C1, C2, the number of times of charging and discharging the capacitor C1, C2 is zero accordingly. Therefore, according to the number of charging and discharging (which is equal to zero at this moment) and the final potential value of the capacitor C1 (at this moment, the potential of the capacitor C2 is zero), the estimation circuit 315 can determine that the potential of the capacitor C1 with a capacitance value is increased by a potential value increment VC1 when the capacitor C1 with the capacitance value is used to receive energy of image electric charge. According to the capacitance of the capacitor C1 and the judged potential value increment VC1, the amount of energy of image electric charge can be equivalently estimated. According to the judged potential value increment VC1, it is capable of calculating the highest exposure strength (i.e., dynamic range of image) of current light source environment.

In addition, the counting circuit 310 detects the capacitor C1, C2 to determine whether the capacitor C1, C2 has been fully charged and determine whether the capacitor C1, C2 has been discharged to zero potential. Assume that the energy of image electric charge is greater than the energy that could be stored in the capacitor C1 or C2 during a single charging operation. As far as charging the capacitor C1 first is concerned, when the capacitor C1 is fully charged with a portion of the energy of image electric charge, the counting circuit 310 controls the switch circuit 305 to perform switching, such that the switch circuit 305 cuts off a connection between the floating node FD and the capacitor C1 so as to make the capacitor C1 be discharged, and the switch circuit 305 establishes a connection between the floating node FD and the capacitor C2 so as to make the capacitor C2 start to receive another portion of the energy of image electric charge to perform charging. When the capacitor C2 is fully charged (it should be noted that the potential of the capacitor C1 is discharged to the zero potential before the capacitor C2 is fully charged), the counting circuit 310 controls the switch circuit 305 again to perform switching, such that the switch circuit 305 cuts off the connection between the floating node FD and the capacitor C2 so as to make the capacitor C2 be discharged, and the switch circuit 305 establishes a connection between the floating node FD and the capacitor C1 so as to make the capacitor C1 start to receive a portion of the energy of image electric charge again to perform charging. At this moment, the counting circuit 310 sets the number of times of charging and discharging the capacitor C1 and the number of times of charging and discharging the capacitor C2 by one, respectively. Through repeatedly controlling the dynamic switching of the switch circuit 305 as mentioned above and detecting/controlling the charging and discharging behavior of the capacitors C1 and C2 that starts from initially receiving the energy of image electric charge and ends at completely receiving the energy of image electric charge via the capacitors C1 and C2, the counting circuit 310 can accumulate the number N1 of times of charging and discharging the capacitor C1 (N1 is a positive integer), and accumulate the number N2 of times of charging and discharging the capacitor C2 (N2 is a positive integer). N1 is equal to N2. The estimation circuit 315 can measure the final potential value VC1 (or VC2) of the capacitor C1 (or C2), and can obtain the numbers N1, N2 of charging and discharging from the counting circuit 310. Therefore, according to the numbers N1, N2 of times of charging and discharging and the final potential value VC1 (or VC2) of the capacitor C1 (or C2), the estimation circuit 315 can determine that the potential of capacitors that are connected in parallel and have a total capacitance value is increased by a potential value increment VC1+VMAX1*N1+VMAX2*N2 or a potential value increment VC2+VMAX1*N1+VMAX2*N2 (depending on whether the finally measured potential value is the final potential value VC1 of the capacitor C1 or the final potential value VC2 of the capacitor C2) when a designed capacitor combination of capacitors C1 and C2 with respective capacitance values is used to receive energy of image electric charge, wherein VMAX1 and VMAX2 are the rated highest potentials of the capacitors C1 and C2 (i.e., the highest potential values of the capacitors C1 and C2 when the capacitors C1 and C2 are fully charged), respectively. According to the capacitance values of the capacitors C1 and C2 and the judged potential value increment VC1+VMAX1*N1+VMAX2*N2 or VC2+VMAX1*N1+VMAX2*N2, the amount of the energy of image electric charge can be equivalently estimated. According to the judged potential value increment as mentioned above, it is capable of estimating the highest exposure strength (dynamic range of image) of the current light source environment.

Furthermore, in an alternative design of the second embodiment, the estimation circuit 315 may be implemented outside the image sensing circuit 300 and thus excluded from the image sensing circuit 300. In other words, the image sensing circuit 300 is arranged to control and count a number of times of charging and discharging the capacitor C1 and a number of times of charging and discharging the capacitor C2, and the subsequent estimation operation is performed by an external estimation circuit. In addition, the switch circuit 305 and the counting circuit 310 may be integrated into a same circuit. Moreover, the capacitors C1 and C2 may be implemented with capacitors having the same capacitance value or capacitors having different capacitance values. If the capacitors C1 and C2 are implemented with capacitors having different capacitance values, the estimation circuit 315 must refer to the different capacitance values of the capacitors C1 and C2, the judged respective potential value increments VMAX1*N1 and VMAX2*N2, and the final potential value (VC1 or VC2) to estimate the amount of the energy of image electric charge and determine the highest exposure strength (dynamic range of image) of the current light source environment. On the contrary, if the capacitors C1 and C2 are implemented with capacitors having the same capacitance value, potential value increments corresponding to different capacitors C1 and C2 can be accumulated, and the calculation performed by the estimation circuit 315 is simpler and easier to be carried out.

Figure 4:
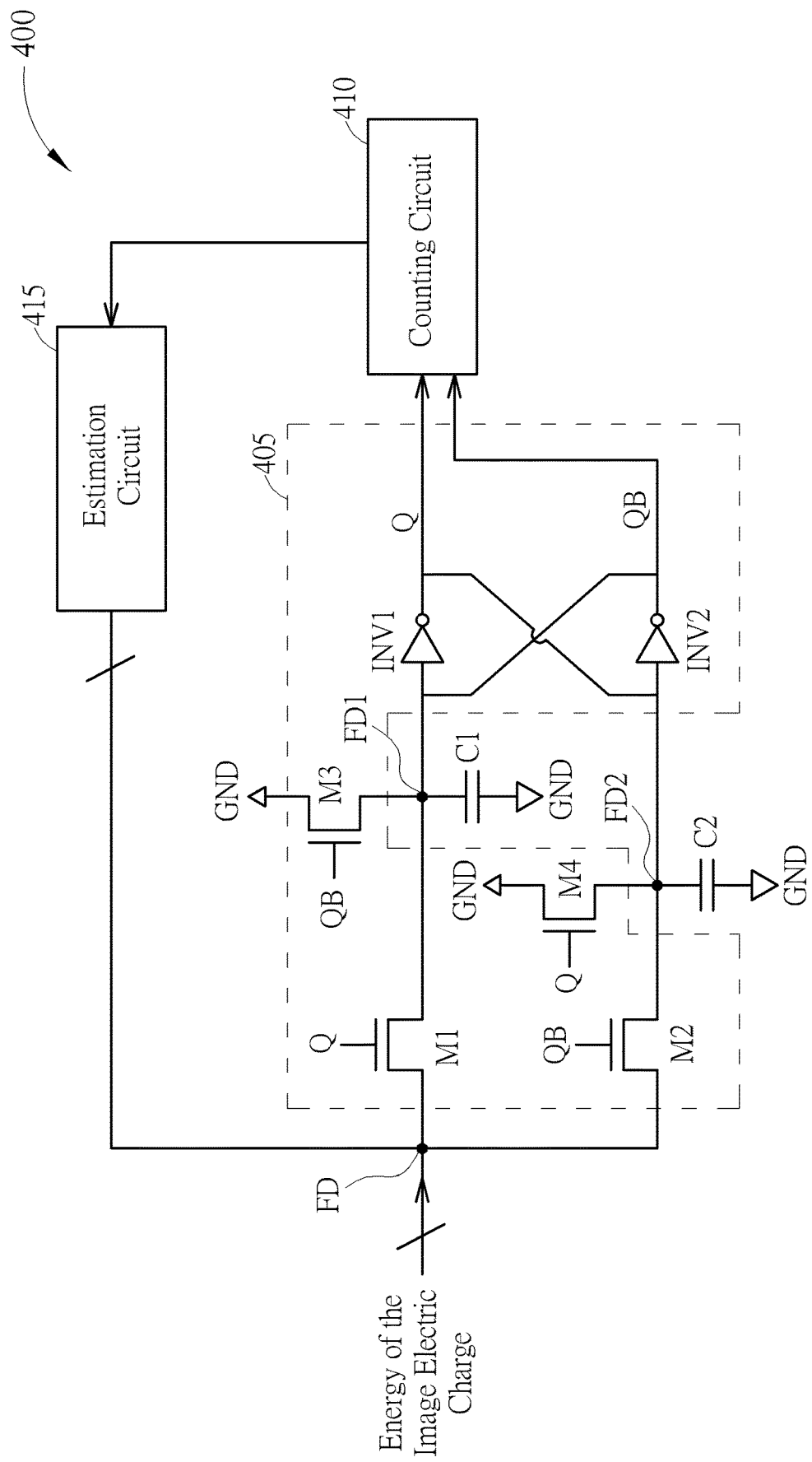
FIG. 4 is a diagram illustrating an image sensing circuit according to a third embodiment of the present invention.

Moreover, the operation of sequentially charging and discharging two capacitors in the present invention may be implemented with an automated control mechanism. Please refer to FIG. 4, which is a diagram illustrating an image sensing circuit 400 according to a third embodiment of the present invention. The image sensing circuit 400 is capable of estimating energy of image electric charge of a photosensitive pixel (which is located outside the image sensing circuit 400 and not shown in FIG. 4). The photosensitive pixel means a pixel unit of a photosensitive element. The pixel unit may generate different amounts of energy of image electric charge in different light source environments (different exposure environments). The image sensing circuit 400 of the present invention can precisely estimate an amount of energy of image electric charge generated by the photosensitive pixel, and correctly calculate an image brightness dynamic range. The image sensing circuit 400 of the present invention is suitable for different exposure environments, and determines energy of image electric charge through the charging and discharging behavior of two capacitors C1 and C2. The image sensing circuit 400 includes a floating node FD, a switch circuit 405, capacitors C1 and C2, a counting circuit 410, and an estimation circuit 415. The switch circuit 405 includes four switches M1, M2, M3, and M4 and a switch controller (which includes inverters INV1 and INV2). The switches M1-M4 are implemented with four transistors. The switch M1 is connected between the floating node and the capacitor C1. The switch M2 is connected between the floating node FD and the capacitor C2. The switch M3 is connected between the capacitor C1 and the ground level GND. The switch M4 is connected between the capacitor C2 and the ground level GND. The states of the switches M1 and M4 are controlled by signal Q, and the states of the switches M2 and M3 are controlled by signal QB, wherein the signals Q and QB are generated by the switch controller that is composed of inverters INV1 and INV2 to automatically control the switch circuit 405 to automatically perform dynamic switching. The signals Q and QB are out of phase. According to the structure of the circuit, the inverter INV1 includes an input terminal and an output terminal. The input terminal of the inverter INV1 is coupled to the potential level (FD1) of the capacitor C1, and the signal Q at the output terminal of the inverter INV1 is arranged to control the states (e.g., an open-circuit state or an closed-circuit state) of the switches M1 and M4. The inverter INV2 includes an input terminal and an output terminal. The input terminal of the inverter INV2 is coupled to the potential level (FD2) of the capacitor C2, and the signal QB at the output terminal of the inverter INV2 is arranged to control the states (e.g., an open-circuit state or a closed-circuit state) of the switches M2 and M3. The input terminal of the inverter INV1 is coupled to the output terminal of the inverter INV2, and the input terminal of the inverter INV2 is coupled to the output terminal of the inverter INV1. When the switches M1 and M4 are controlled by the signal Q to be switched on, the signal QB controls the switches M2 and M3 to be open-circuited to cut off the connection. Hence, the potential FD1 of the capacitor C1 is coupled to the floating node FD without being coupled to the ground level GND, and the capacitor C1 is arranged to perform charging to receive energy of image electric charge. In addition, the potential FD2 of the capacitor C2 is connected to the ground level GND to perform discharging. On the contrary, when the switches M2 and M3 are controlled by the signal QB to be switched on, the signal Q controls the switches M1 and M4 to be open-circuited to cut off the connection. Hence, the potential FD1 of the capacitor C1 is coupled to the ground level GND to perform discharging. The potential FD2 of the capacitor C2 is coupled to the floating node FD without being coupled to the ground level GND, and the capacitor C2 is arranged to perform charging to receive energy of image electric charge. The above-mentioned automated control mechanism is that, in the process of charging the potential FD1 of the capacitor C1 from the zero potential to the rated highest potential, the operation of the inverters INV1 and INV2 enables the signal Q to switch from a high potential to a low potential, and enables the signal QB to switch from a zero potential to a high potential. In this way, the switch M1 is controlled to switch from a closed-circuit state to an open-circuit state, and the switch M3 is controlled to switch from an open-circuit state to a closed-circuit state, such that the capacitor C1 automatically starts to perform discharging as soon as the capacitor C1 is charged to the rated highest potential. Similarly, the capacitor C2 is controlled to automatically start to perform discharging as soon as the capacitor C2 is charged to the rated highest potential.

Figure 5:
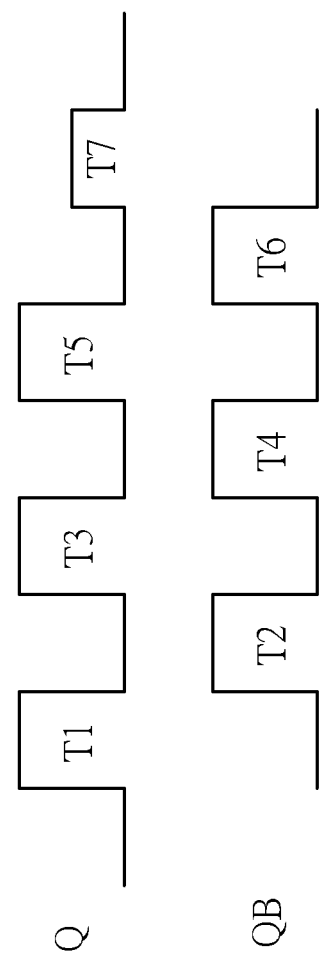
FIG. 5 is a diagram illustrating the signal waveforms of the signals Q and QB shown in FIG. 4.

In addition to the operation of counting the number of times of charging and discharging a capacitor or judging the charging and discharging behavior of a capacitor via detecting a potential change of a terminal of the capacitor as described in the above-mentioned first and second embodiments, the counting circuit 410 can count a number of signal level transitions of the signals Q and QB to count a number of times of charging and discharging the capacitors C1 and C2. Please refer to FIG. 5, which is a diagram illustrating the signal waveforms of the signals Q and QB shown in FIG. 4. As shown in FIG. 5, T1 through T7 correspond to the signal pulses of the signals Q and QB, and represent the charging orders of the capacitors C1 and C2. For example, the capacitor C1 is first charged at T1, the capacitor C2 is charged and the capacitor C1 is discharged at T2, and so on. At T7, the capacitor C1 is charged to completely receive the remaining energy of image electric charge. In practice, the counting circuit 410 can count the signal transitions of rising edges and falling edges of the signals Q and QB to determine whether the capacitors C1 and C2 have accomplished a complete charging and discharging behavior once. For example, the counting circuit 410 detects a rising edge and a falling edge of a signal pulse (which corresponds to T1) of the signal Q to judge that the capacitor C1 currently finishes a complete charging and discharging behavior once, and thus sets the number of times of charging and discharging the capacitor C1 by one. In this way, the counting circuit 410 of this example therefore can count that each of the capacitors C1 and C2 finally have the complete charging and discharging behavior three times. In addition, the operation and function of the estimation circuit 415 are similar to that of the estimation circuit 315 shown in FIG. 3, and the detailed description thereof is omitted here for brevity.

Moreover, in the aforementioned embodiments, the capacitors C1 and C2 have different capacitance values. For example, C1 is larger than C2 to meet different requirement of dynamic range. For example, when the surrounding light is low, C2 can be applied first to ensure a proper dynamic range in the beginning, and when the surrounding light is bright, C1 can be applied first, and vice versa.

Moreover, the present invention can estimate an amount of energy of image electric charge by counting the charging and discharging behavior of three or more capacitors, wherein the design of a switch circuit may include multiple switches corresponding to the number of three or more capacitors, and the switch circuit is arranged to switch on at least one switch at any time such that at least one corresponding capacitor can be used for charging to receive energy of image electric charge, and at least one switch is in an open-circuit state such that there is at least another capacitor used for discharging. For example, when the charging and discharging behavior of three capacitors is utilized to estimate an amount of energy of image electric charge, the switch circuit can be designed to have the first switch that is switched on (i.e., in a closed-circuit state), the second switch that is in an open-circuit state, and the third switch that may be about to be switched from an open-circuit state to a closed-circuit state or may just enter the closed-circuit state, such that there is at least one capacitor that can be used for charging, and there is one capacitor which is performing discharging. For example, after the first capacitor that corresponds to the first switch and is originally used for charging has been charged for a period of time and is about to perform discharging, the third switch has been switched from an open-circuit state to a closed-circuit state, such that the third capacitor has started to perform charging. An advantage of such design is that energy of image electric charge can be seamlessly and sequentially received by the three capacitors.

It should be noted that, in the above-mentioned embodiments, the potential of a capacitor is discharged to a zero potential when the capacitor performs discharging. However, this is not meant to be a limitation to the present invention. In other alternative designs, the potential of a capacitor may be discharged to a lower potential when the capacitor performs discharging, and the above-mentioned estimation circuit only needs a slight modification on the estimation of a potential value increment generated by energy of image electric charge. For example, the calculation approach for a potential value increment generated due to a single charging operation is just changed from an increment calculation method that calculates an increment from a zero potential to a predetermined potential to another increment calculation method that calculates an increment from a lower voltage potential to a predetermined potential.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image sensing circuit comprising:
   a floating node, arranged to receive image electric charge from a photosensitive pixel; and
   a switch circuit, coupled between the floating node and a plurality of capacitors, the switch circuit arranged to dynamically connect and disconnect the floating node and the capacitors one at a time in a sequence;
   wherein the plurality of capacitors have at least two different capacitance values;
   wherein the switch circuit dynamically switches to make the capacitors be dynamically charged and discharged in response to exposure time period to receive energy of the image electric charge, and the energy of the image electric charge is determined by a number of times of discharging of the capacitors and a finally measured potential value of the one capacitor being connected to the floating node.

2. The image sensing circuit of claim 1, wherein the switch circuit is arranged for:
   connecting the floating node and one capacitor to receive a portion of the energy of the image electric charge;
   cutting off a connection between the floating node and the connected capacitor to make the capacitor be discharged when the capacitor is fully charged with the portion of the energy of the image electric charge; and
   connecting the floating node to another capacitor to receive another portion of the energy of the image electric charge when the capacitor is discharging.

3. The image sensing circuit of claim 1, further comprising:
   an estimation circuit, coupled to the capacitors and the counting circuit, the estimation circuit arranged to measure a final potential of the one capacitor being connected to the floating node, and estimate the energy of the image electric charge according to the number of times of discharging of the at least one capacitor and the finally measured potential value of the capacitor, wherein the energy of the image electric charge used is used to determine a highest exposure range of the photosensitive pixel.

4. The image sensing circuit of claim 1, wherein the plurality of capacitors comprise a first capacitor and a second capacitor, and the switch circuit comprises:
   a first switch, connected between the floating node and the first capacitor;
   a second switch, connected between the floating node and the second capacitor;
   a third switch, connected between the first capacitor and the ground level; and
   a fourth switch, connected between the second capacitor and the ground level;
   wherein when the first switch and the fourth switch are switched on, the first capacitor is arranged to perform charging to receive the energy of the image electric charge, and the second capacitor is arranged to perform discharging; and when the second switch and the third switch are switched on, the second capacitor is arranged to perform charging to receive the energy of the image electric charge, and the first capacitor is arranged to perform discharging.

5. The image sensing circuit of claim 4, wherein the switch circuit further comprises a switch controller, and the switch controller comprises:
   a first inverter, comprising an input terminal and an output terminal, wherein the input terminal of the first inverter is coupled to a potential level of the first capacitor, a first signal at the output terminal of the first inverter is arranged to control states of the first switch and the fourth switch; and a second inverter, comprising an input terminal and an output terminal, the input terminal of the second inverter is coupled to a potential level of the second capacitor, a second signal at the output terminal of the second inverter is arranged to control states of the second switch and the third switch;

wherein the input terminal of the first inverter is coupled to the output terminal of the second inverter, and the input terminal of the second inverter is coupled to the output terminal of the first inverter.

6. The image sensing circuit of claim 5, wherein the first signal is an inverting signal of the second signal, and the image sensing circuit is arranged to use a number of signal level transitions of the first signal and the second signal to determine a number of times of discharging the first capacitor and a number of times of discharging the second capacitor.

7. The image sensing circuit of claim 1, wherein the plurality of capacitors comprises three capacitors, and the switch circuit switches on at least one switch at any time to make at least a capacitor in the three capacitors be used for charging to receive the energy of the image electric charge.

* * * * *